US008463324B1

(12) United States Patent
Kormanyos et al.

(10) Patent No.: US 8,463,324 B1
(45) Date of Patent: Jun. 11, 2013

(54) ANTENNA AND QUASI-OPTIC POWER AMPLIFIER ELEMENT AND ARRAY FOR A RADIO FREQUENCY SYSTEM

(75) Inventors: Brian K. Kormanyos, Edmonds, WA (US); Jeremy Popp, Duvall, WA (US); Timothy T. Lee, Rancho Palos Verdes, CA (US); Alfred E. Lee, Torrance, CA (US); Gregory A. Kromholtz, Seattle, WA (US)

(73) Assignee: The Boeing Company, Chicago, IL (US)

( * ) Notice: Subject to any disclaimer, the term of this patent is extended or adjusted under 35 U.S.C. 154(b) by 325 days.

(21) Appl. No.: 12/641,764

(22) Filed: Dec. 18, 2009

(51) Int. Cl.
*H04B 1/38* (2006.01)

(52) U.S. Cl.
USPC ..................... 455/562.1; 455/114.3; 455/102; 455/121; 455/269; 359/276; 359/278; 359/333; 330/286; 342/175

(58) Field of Classification Search
USPC ................... 455/562.1, 114.3, 102, 121, 269, 455/272; 359/276, 278, 333; 330/286; 342/175
See application file for complete search history.

(56) References Cited

U.S. PATENT DOCUMENTS

| | | | | |
|---|---|---|---|---|
| 4,816,791 | A * | 3/1989 | Carnahan et al. | 333/33 |
| 5,886,671 | A | 3/1999 | Riemer et al. | |
| 7,184,205 | B1 * | 2/2007 | Lynch | 359/333 |
| 7,417,598 | B2 | 8/2008 | Navarro et al. | |
| 2006/0139739 | A1 * | 6/2006 | Higgins et al. | 359/333 |
| 2007/0155520 | A1 * | 7/2007 | Savarese et al. | 473/131 |
| 2008/0315993 | A1 * | 12/2008 | Kipnis et al. | 340/10.1 |

OTHER PUBLICATIONS

Chireix, H., "High Power Outphasing Modulation", Proceedings of the Institute of Radio Engineers, vol. 23, No. 11, pp. 1370-1392 (Nov. 1935).
Kahn, Leonard R., "Single-Sideband Transmission by Envelope Elimination and Restoration", Proceedings of the I.R.E., vol. 40, pp. 803-806 (Jul. 1952).
Costas, J.P., "Synchronous communications", Proceedings of IRE, pp. 99-105 (Dec. 1956).
Cox, D.C., "Linear Amplification with Nonlinear Components", IREE Transactions on Communications, vol. 22, pp. 1942-1945 (Dec. 1974).
Mink, James W., "Quasi-Optical Power Combining of Solid-State Millimeter-Wave Sources", IEEE Transactions on Microwave Theory and Techniques, vol. MTT-34, No. 2, pp. 273-279 (Feb. 1986).
Rebeiz, Gabriel, "Millimeter-Wave and Terahertz Integrated Circuit Antennas", Proceedings of the IEEE, vol. 80, No. 11, pp. 1748-1770 (Nov. 1992).
Liu, Cheh-Ming, et al., "40 GHz Monolithic Grid Amplifier", 53rd Annual Device Research Conference, pp. 92-93 (1995).
Mader, Thomas B., et al., "Switched-Mode High-Efficiency Microwave Power Amplifiers in a Free-Space Power-Combiner Array", IEEE Transactions on Microwave Theory and Techniques, vol. 46, No. 10, pp. 1391-1398 (Oct. 1998).

(Continued)

*Primary Examiner* — Tuan Pham
(74) *Attorney, Agent, or Firm* — Charles L. Moore; Moore & Van Allen PLLC

(57) ABSTRACT

An antenna and power amplifier element assembly may include an antenna assembly and a quasi-optic power amplifier. The quasi-optic power amplifier may include an output transistor coupled to the antenna assembly. A harmonic trap may be coupled to the quasi-optic power amplifier.

21 Claims, 7 Drawing Sheets

OTHER PUBLICATIONS

Andreani, Pietro, et al., "A Chip for Linearization of RF Power Amplifiers Using Digital Predistortion with a Bit-Parallel Complex Multiplier", IEEE Intl. Symposium on Circuits and Systems (1999).
Ortiz, Sean, et al., "A 25 Watt and 50 Watt Ka-Band Quasi-Optical Amplifier", IEEE International MTT-S Digest, pp. 797-800 (2000).
Raab, Frederick H., et al., "Power Amplifiers and Transmitters for RF and Microwave", IEEE Transactions on Microwave Theory and Techniques, vol. 50, No. 3, pp. 814-826 (Mar. 2002).
Delisio, Michael P., et al., "A Ka-Band Grid Amplifier Module with Over 10 Watts Output Power", IEEE MTT-S Digest, pp. 83-86 (Jun. 2004).
Wang, Feipeng, et al., "Design of Wide-Bandwidth Envelope-Tracking Power Amplifiers for OFDM Applications", IEEE Transactions on Microwave Theory and Techniques, vol. 53, No. 4, pp. 1244-1255 (Apr. 2005).
Popp, Jeremy, et al., "A Fully-Integrated High-Efficient RF Class E SiGe Power Amplifier With and Envelope-Tracking Technique for EDGE Applications", Dig. IEEE Radio and Wireless Symposium (RWS 2006), pp. 231-234 (Jan. 17-19, 2006).
Tanaka, Masayoshi, "Spatially Superposed 64-QAM Communication System", 24th AIAA International Communications Satellite Systems Conferences (ICSSC), San Diego, California (Jan. 11-14, 2006).
Schaubert, D.H., et al., "Vivaldi Antenna Arrays for Wide Bandwidth and Electronic Scanning", IEEE EuCAP Second European Conference on Antennas and Propagation (Nov. 11-16, 2007).
Li, Hao, et al., "A Fast Digital Predistortion Algorithm for Radio-Frequency Power Amplifier Linearization with Loop Delay Compensation", IEEE Journal of Selected Topics in Signal Processing, vol. 3, No. 3, pp. 374-383 (Jun. 2009).

* cited by examiner

ANTENNA AND QUASI-OPTIC POWER AMPLIFIER ELEMENT AND ARRAY FOR A RADIO FREQUENCY SYSTEM

FIELD

The present disclosure relates to Radio Frequency (RF) systems including but not limited to communications systems, RADAR systems and the like, and power amplifier arrays for such systems and other applications, and more particularly to an antenna and quasi-optic power amplifier element and array for RF systems and other applications.

BACKGROUND

Increasing the overall power of a single solid state power amplifier requires increases in the device size and current at any voltage. Increasing the device size and current can lead to corresponding impedance matching problems. The impedance matching issue has lead to designs involving power combining of one form or another, such as for example combining power from multiple smaller devices. There is also a need to allow power amplifiers to self calibrate using low overhead in circuitry, and minimal degradation of power consumption and performance. Current systems using multiple power amplifiers require complex and time consuming post fabrication trimming and component selection for optimal gain, power output, and stability that add to cost and complexity of the packaging and fielding of amplifier modules.

Additionally, ordinary RF amplifiers introduce distortions to amplitude and phase information associated with digital modulation methods. The distortion arises from gain compression and phase changes in the amplifier as the envelope moves through different power levels. The distortion can be avoided by operating the amplifier far below its peak rated power where gain compression and phase change are lower. Many transmitters handling high order digital data with both amplitude and phase modulation operate with amplifiers that are backed off from peak power, having sufficient linearity to avoid distortion of the amplitude and phase information. This results in the need for a much larger amplifier operating at lower direct current (DC) to RF efficiency. As a result of these deficiencies, there is a need for a high efficiency power amplifier capable of extremely high frequency operation, on the order of about 40 GHz to about 220 GHz or higher operating frequencies, and that is directly coupled to an antenna array that is adapted to transmit digital data using standard high order modulation schemes.

BRIEF SUMMARY

In accordance with one embodiment, an antenna and power amplifier element assembly may include an antenna assembly and a quasi-optic power amplifier. The quasi-optic power amplifier may include an output transistor coupled to the antenna assembly. A harmonic trap may be coupled to the quasi-optic power amplifier.

In accordance with one embodiment, an antenna and power amplifier array assembly may include a plurality of antenna and power amplifier element assemblies formed in a predetermined array configuration on a substrate. Each of the plurality of antenna and power amplifier element assemblies may include a power amplifier transistor array. A receive antenna assembly may be electrically coupled to the power amplifier transistor array. A first transmit antenna assembly may also be electrically coupled to the power amplifier transistor array and may extend from the substrate on one side of the receive antenna assembly. A second transmit antenna assembly may be electrically coupled to the power amplifier transistor array and may extend from the substrate on an opposite side of the receive antenna assembly. A harmonic trap may also be electrically coupled to the power amplifier transistor array.

In accordance with one embodiment, a RF system may include an amplitude modulation and phase modulation (AM/PM) generator to receive data. An AM/PM calibration unit may receive output signals from the AM/PM generator and a data dependent pre-distortion unit may receive output signals from the AM/PM calibration unit. The RF system may also include a two-dimensional antenna and power amplifier array to transmit data from the data dependent pre-distortion unit. The two-dimensional antenna and power amplifier array may include a plurality of antenna and quasi-optical power amplifier element assemblies. The RF system may additionally include circuitry to selectively operate each of the plurality of antenna and quasi-optical power amplifier element assemblies at a predetermined digital modulation scheme.

Other aspects and features of the embodiments, as defined solely by the claims, will become apparent to those ordinarily skilled in the art upon review of the following non-limited detailed description in conjunction with the accompanying figures.

BRIEF DESCRIPTION OF THE SEVERAL VIEWS OF THE DRAWINGS

The following detailed description of embodiments refers to the accompanying drawings. Other embodiments having different structures and operations do not depart from the scope of the present disclosure.

DETAILED DESCRIPTION

The following detailed description of embodiments refers to the accompanying drawings, which illustrate specific embodiments. Other embodiments having different structures and operations do not depart from the scope of the present disclosure.

Figure 1:
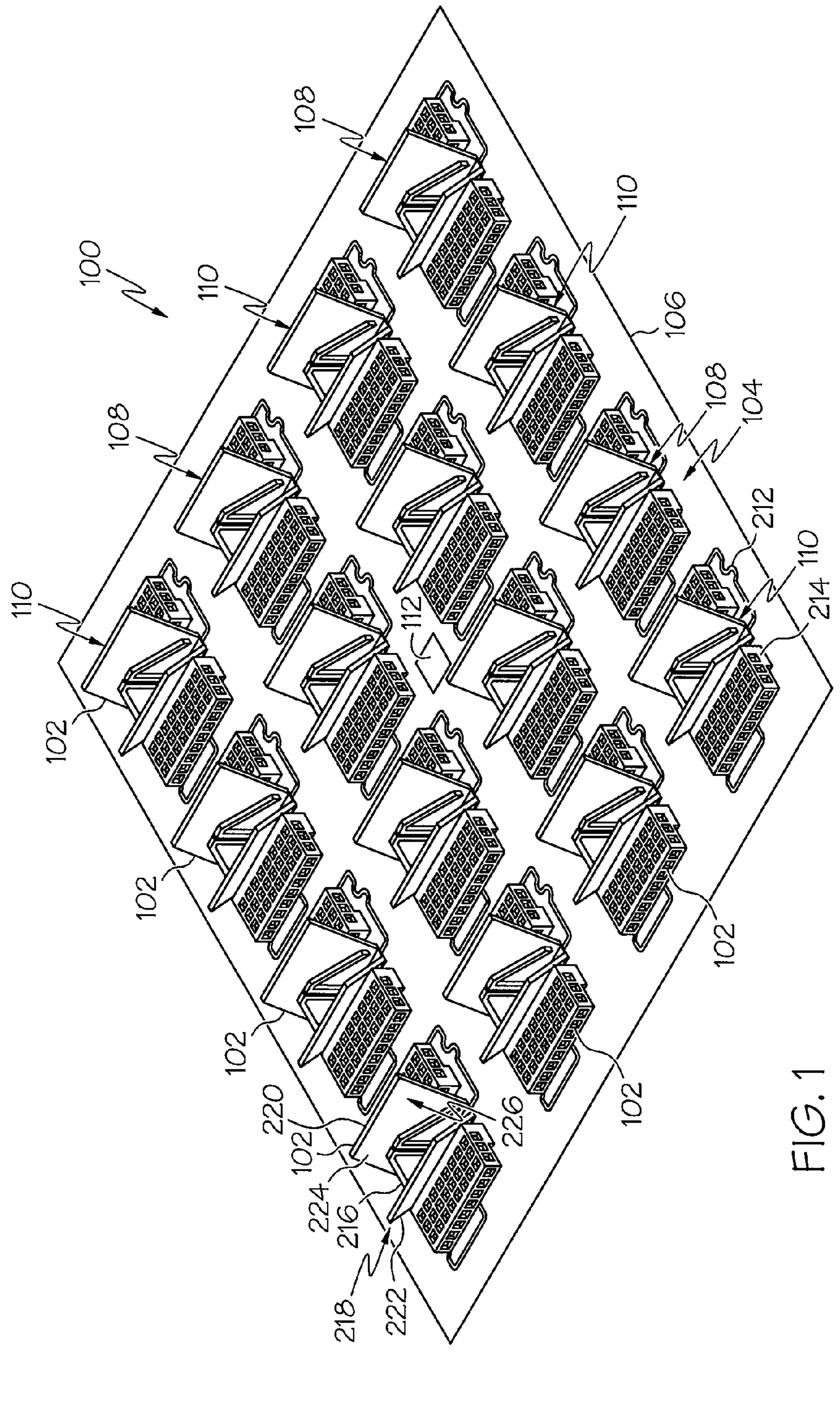
FIG. 1 is a perspective view of an example of an antenna and power amplifier array assembly in accordance with an embodiment.

FIG. 1 is a perspective view of an example of an antenna and power amplifier array assembly 100 in accordance with an embodiment. The antenna and amplifier array assembly 100 may be used in a RF system for transmitting and receiving data. The antenna and power amplifier array assembly 100 may include a plurality of antenna and power amplifier element assemblies 102 formed in a predetermined array configuration 104 on a substrate 106. In the example illustrated in FIG. 1, the antenna and power amplifier element assemblies 102 are arranged or disposed in a two-dimensional array.

Figure 2:
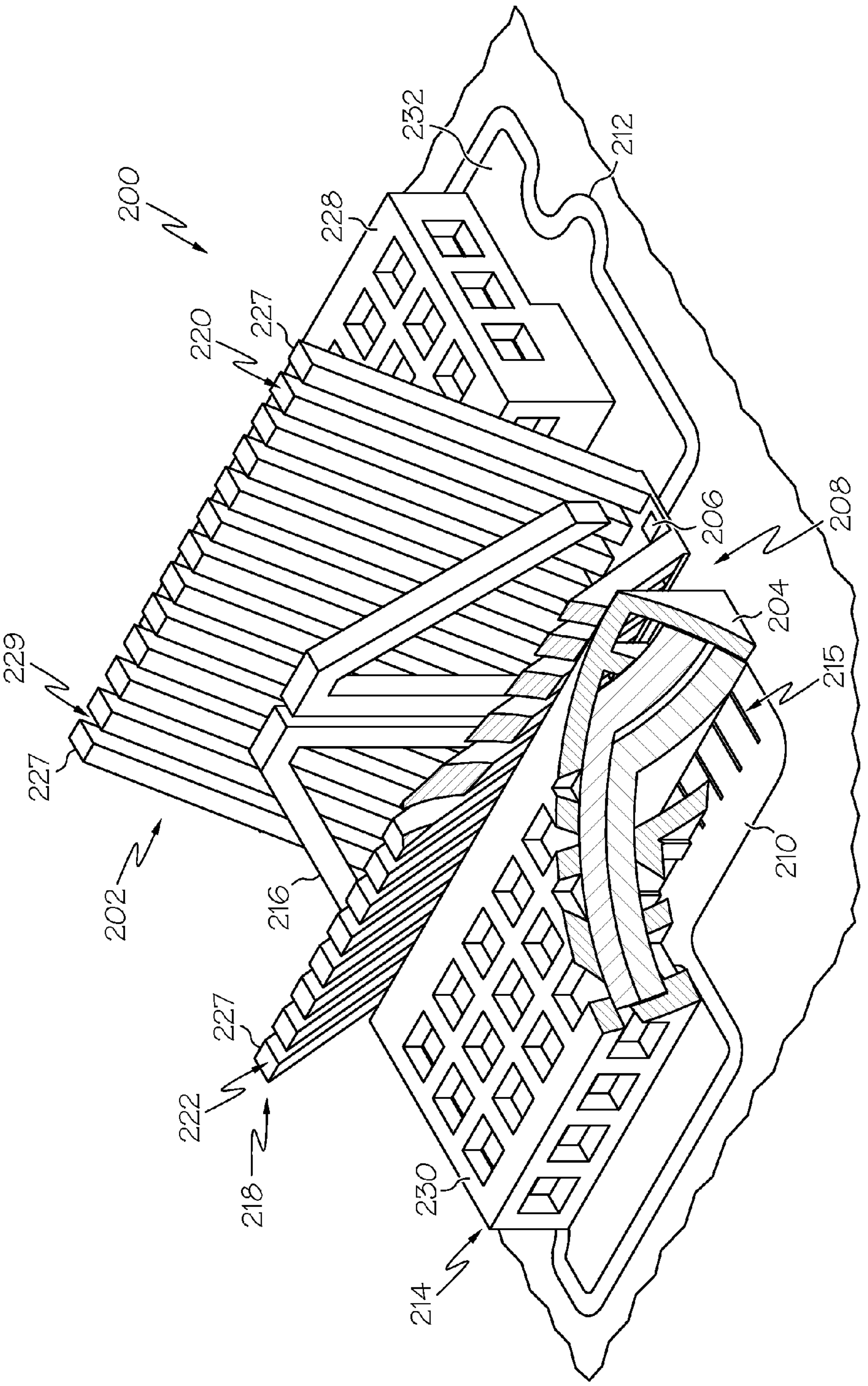
FIG. 2 is a detailed perspective view of an example of an antenna and power amplifier element in accordance with an embodiment.

Referring also to FIG. 2, FIG. 2 is a detailed perspective view of an example of an antenna and power amplifier element 200 or element assembly in accordance with an embodiment. The antenna and power amplifier element 200 may be used for the antenna and power amplifier element assemblies 102 in FIG. 1. The antenna and power amplifier element 200 or element assembly may include an antenna assembly 202 and a power amplifier 204. The power amplifier 204 may be a quasi-optic power amplifier including an output transistor 206 coupled to the antenna assembly 202.

In accordance with an embodiment, a power amplifier transistor array 208 may be used in the antenna and power amplifier element 200, and the antenna and power amplifier element 200 may be scalable as described herein for operation at increased output powers. The quasi-optic power amplifier 204 or array 208 may be adapted for operation as a class E or a class F power amplifier as well as other classes of power amplifiers in some applications. Class E/F power amplifiers are generally used for electronically switching electric current or electrical power and are typically used for higher frequency switching where the switching time becomes comparable to the duty cycle or time the amplifier is on or active to supply power to a load or other device.

The quasi-optic power amplifier 204 or array may also include a scalable dimension for increasing an operating power of each power amplifier array 208. The power amplifier transistor array 208 may be supplied power by a slotted power divider 210. A 90 degree delay line 212 may also be coupled to the power amplifier transistor array 208 for operation of the power amplifier transistor array 208 in a different phase or mode relative to other antenna and power amplifier elements 200 or 102 in the power amplifier array assembly 100 (FIG. 1) and as described in more detail herein.

The antenna and power amplifier element 200 may also include a harmonic trap 214 or traps to trap or mitigate any harmonic signals that may be generated by high power signals that may be transmitted to the antenna assembly 202 by electrical circuitry 215 associated with or feeding the antenna and power amplifier element 200.

The antenna and power amplifier array assembly 100 and elements 102 or 200 may be formed on a single equal phase input and output plane or substrate 106 and may be scalable to increase an output power of the assembly 100. Each antenna and power amplifier assembly 200 is scalable with a minimal parasitic effect because the components are formed with the single equal phase input and output plane 106 and the plane being extendable in at least one dimension.

The antenna and power amplifier element assembly 200 may also include an architecture to substantially maximize efficiency of DC to RF power conversion in the quasi-optical amplifier 204 operating at any frequency and in particular at millimeter wave frequencies between about 40 GHz and about 220 GHz or higher and to support a predetermined digital modulation scheme.

The antenna assembly 202 may include a receive antenna assembly 216 and a transmit antenna assembly 218. The receive antenna assembly 216 may be electrically coupled to the quasi-optic power amplifier 204 or power amplifier array 208 and may extend substantially perpendicular from the substrate 106. The transmit antenna assembly 218 may also be electrically coupled to the quasi-optical power amplifier 204 or power amplifier array 208. The transmit antenna assembly 218 may include a first transmit antenna assembly 220 and a second transmit antenna assembly 222. The first transmit antenna assembly 220 may extend from the substrate 106 on one side of the receive antenna assembly 216 and may extend from the substrate 106 at a predetermined angle relative to a plane defined by the substrate 106. The second transmit antenna assembly 222 may extend from the substrate 106 on an opposite side of the receive antenna assembly 216 and may extend from the substrate 106 at the predetermined angle relative to the plane defined by the substrate 106. A portion of the transmit antenna assembly 222 and the harmonic trap 214 have been cut-away or removed for purposes of illustrating underlying features, such as the slotted power divider 210.

Because the first and second transmit antenna assemblies 220 and 222 are co-located with the receive antenna assembly 216, the receive antenna assembly 216 is operable in one polarization and the first and second transmit antenna assemblies 220 and 222 are operable in a different polarization to prevent coupling between the receive antennas and the transmit antennas.

In at least one embodiment, similar to that illustrated in the example in FIG. 1, the first transmit antenna assembly 220 and the second transmit antenna assembly 222 may each include a single transmit antenna element 224. Each single transmit antenna element 224 may have a broad face 226 to act as a corner reflector. The corner reflector may concentrate power on the receive antenna assembly 216.

Figure 4:
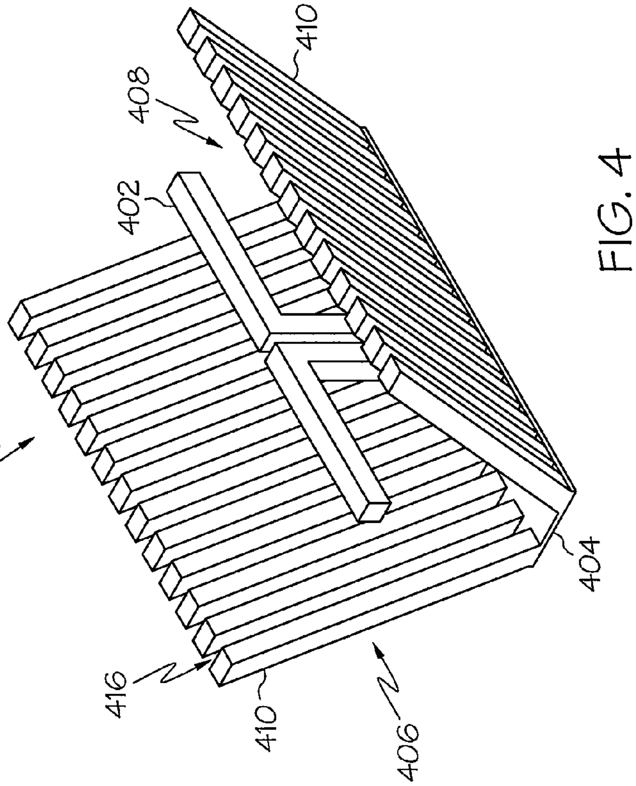
FIG. 4 is a perspective view of an example of an antenna and power amplifier element in accordance with a further embodiment.
Figure 3:
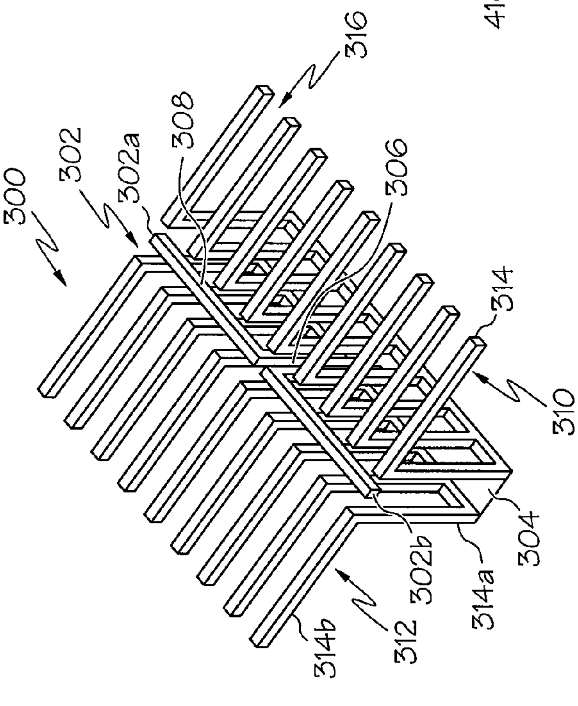
FIG. 3 is a detailed perspective view of an example of an antenna and power amplifier element in accordance with another embodiment.

In at least one other embodiment, similar to that illustrated in the example in FIG. 2, the first transmit antenna assembly 220 and the second transmit antenna assembly 222 may each include a plurality of dipole antenna elements 227 connected together. Each of the first and second transmit antenna assemblies 216 and 218 may be formed in a row and may extend from the substrate at a predetermined angle to provide a selective radiation pattern. FIGS. 3 and 4 illustrate additional examples of receive and transmit antenna assemblies.

FIG. 3 is a detailed perspective view of an example of an antenna and power amplifier element 300 in accordance with another embodiment. The antenna and power amplifier element assembly 300 may include a receive antenna assembly 302 coupled to a quasi-optic power amplifier array 304. The receive antenna assembly 302 may be a bent dipole antenna. Each bent dipole section 302*a* and 302*b* may include a first antenna portion 306 extending substantially perpendicular from the quasi-power amplifier array 304 and a second antenna portion 308 extending substantially perpendicular from the first antenna portion 306.

The antenna and power amplifier element assembly 300 may also include first and second transmit antenna assemblies 310 and 312 disposed on opposite sides of the receive antenna assembly 302. Each of the first and second transmit antenna assemblies 310 and 312 may include an array of bent dipole antennas 314. Each bent dipole antenna 314 may include a vertical section 314*a* extending substantially particular from the quasi-optic power amplifier array 304 or substrate and a horizontal section 314*b* extending substantially perpendicular from the vertical section 314*a*.

FIG. 4 is a perspective view of an example of an antenna and power amplifier element 400 in accordance with a further embodiment. The antenna and power amplifier element of 400 may include a receive antenna assembly 402 coupled to a quasi-optic power amplifier array 404. The receive antenna assembly 402 may be a bent dipole antenna similar to the receive antenna 302 in FIG. 3. The antenna and power amplifier element 400 may also include first and second transmit antenna assemblies 406 and 408. The first and second transmit antenna assemblies 406 and 408 may be disposed on opposite sides of the receive antenna 402. The first and second transmit antenna assemblies 406 and 408 may each include an array of antenna elements 410. Each antenna element 410 may extend from the quasi-optic power amplifier array 404 at a predetermined angle relative to a plane defined by a substrate on which the antenna and power amplifier element 400 may be mounted or formed similar to substrate 106 in FIG. 1.

Referring back to FIGS. 1 and 2, the harmonic trap 214 may include a first harmonic trap portion 228 and a second harmonic trap portion 230. The first harmonic trap portion 228 may be formed on a side of the first transmit antenna assembly 220 opposite to the receive antenna assembly 216. The second harmonic trap portion 230 may be formed on a side of the second transmit antenna assembly 222 opposite to the receive antenna assembly 216. Each of the harmonic trap portions 228 and 230 may be formed from parallel transmission lines and may be adapted to be extendable on an equal phase plane 232. The equal phase plane 232 may correspond to the substrate 106 in FIG. 1. The first and second harmonic trap portions 228 and 230 may be adapted to provide an open circuit for all harmonic frequencies for class E operation of the antenna and power amplifier assembly 100. Additionally, the first and second harmonic power trap portions 228 and 230 may be adapted to provide an open circuit for odd harmonics and a short circuit for even harmonics for class F operation of the antenna and power amplifier assembly 100.

The antenna and power amplifier elements 102 in the antenna and power amplifier array 100 may be divided into at least two groups 108 and 110 which may be alternately formed or disposed on the substrate 106 or equal phase input and output plane or may be formed or disposed in a checkerboard type configuration. One group 108 is operable at a 90 degree phase difference relative to the other group 110 or each group operates at a 90 degree phase difference from each of the other groups so that the constellation states of a high order digital modulation scheme may be produced directly by varying the relative amplitude between the groups. To support symmetric full four quadrant operation, four groups at 0, 90, 180, and 270 degrees may be used or appropriate switching of delay elements may be used to create these four phase states within two main operational groups, such as groups 108 and 110. This configuration may allow for ordinary carrier phase recovery circuits or algorithms to be used. The two groups 108 and 110 of the antenna and power amplifier element assemblies 102 may be operable at variable power setting to result in a vector summation capable of creating different amplitude and phase states corresponding to different digital modulation schemes. The variable power settings for each antenna and power amplifier assembly may be controlled by a discrete digitally controlled power level unit 112 or controller. Examples of the different modulation schemes that may be generated may include a 64 state quadrature amplitude modulation (64QAM), an orthogonal frequency division multiple access (OFDM) mode, or other high order digital modulation schemes. The unit 112 or controller may vary a phase of each antenna and power amplifier element 102, 200 to allow beam steering and to enhance spatial power combiner efficiencies. The unit 112 or controller may also selectively turn on and off each of the plurality of antenna and power amplifier element assemblies 102, 200 or to calibrate chosen antenna and power amplifier element assemblies out of the array 100. The array 100 may still operate efficiently with degradation or loss of a limited number of antenna and power amplifier element assemblies 102, 200.

Amplitude and phase states may be created by interlacing the two antenna groups 108 and 110 in the array 100, one group operating with a 90 degree phase difference from the other group, and by controlling the relative amplitude ratio between the two groups 108 and 110. The amplitude for the two groups 108 and 110 across the array 100 may be controlled not only by controlling the drain voltage across combinations of elements 102, 200 or element assemblies but also by controlling the drain voltage between segments of individual element or element assemblies. As previously described, the individual elements 102, 200 or element assemblies may have their transmit antenna elements 218 (FIG. 2), 310, 312 (FIGS. 3), 406 and 408 (FIG. 4) divided into separate antenna segments or elements, for example dipole antenna elements 227 in FIG. 2, dipole antennas 314 in FIG. 3 and antenna elements 410 in FIG. 4. The antenna segments or elements are divided or separated by slits 229, 316 and 416 or spacings as illustrated in FIGS. 2, 3 and 4 respectively. The slits 229 316, 416 may divide each transmit antenna assembly or element 218, 310, 312, 406 and 408 into approximately 16 antenna segments or elements 227, 314 and 410 with about a 100 micrometer width each and a slit spacing along the half wavelength extent to break up edge currents and allow the receive antenna to function properly. Each of these antenna segments or elements 227, 314 and 410 may have a drain voltage of the power amplifier to which they are electrically coupled independently controlled to provide digital amplitude control within an individual element beyond the number of voltage steps. This configuration provides substantially improved radiation pattern control, higher order modulation, and improved linearization Adjacent Channel Power Ratio (ACPR).

Control of the operation of the individual antenna and power amplifier element assemblies 102 or 200 by the array assembly 100 or system permits higher efficiency to be achieved by operating groups of amplifiers in different phase quadrature to synthesize amplitude states (linear amplification using non-linear components). These efficiency benefits may carry from any non-linear mode of operation including Class B, C, D, E, F and any intermediate modes (class J) directly. Nominally linear amplifiers of class A and AB may also operate as partially non-linear components if driven hard into saturation where the amplifiers would have higher efficiency and would also benefit from linearization. The only modes that may not be suitable for the efficiency gains from the quadrature operation of the array 100 may be the purely linear modes class A and class AB not driven into saturation. However, the antenna configuration and architecture described herein may still apply to arrays of class A and AB linear (not saturated) amplifiers. However, the quadrature operation to synthesize an amplitude envelope is not clearly an advantage in this case. The harmonic traps would have no function, and linearization in general would be of little value in the purely linear amplifiers if they were not driven hard into saturation.

Figure 6:
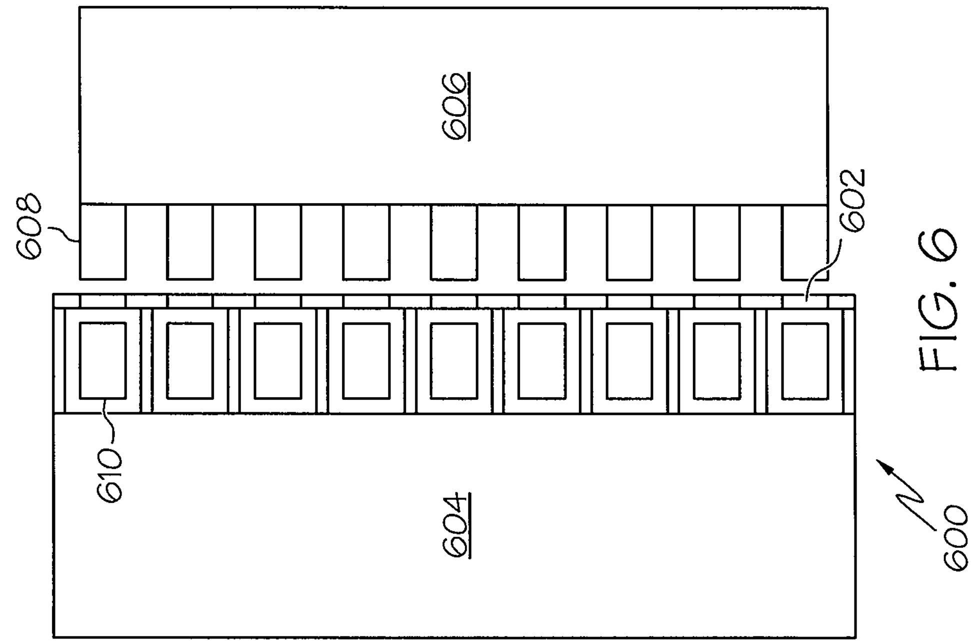
FIG. 6 is an example of a configuration for transistor devices for an antenna and power amplifier element in accordance with another embodiment.
Figure 5:
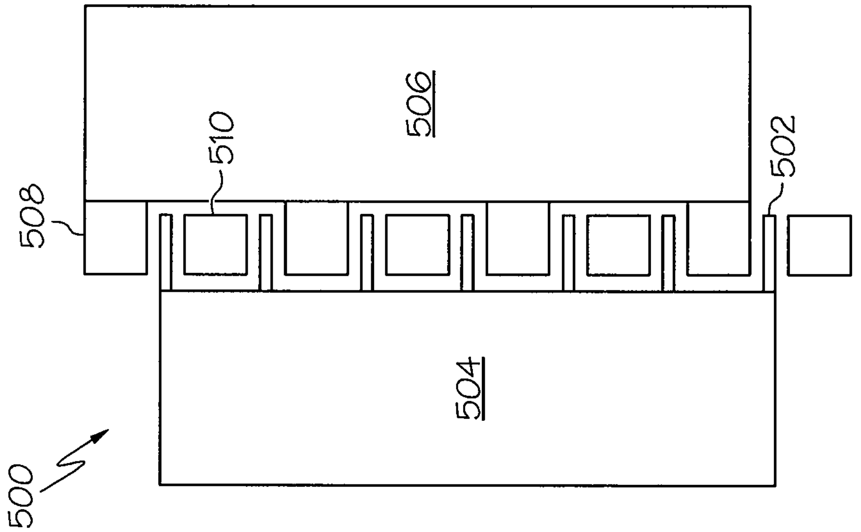
FIG. 5 is an example of a configuration for transistor devices for an antenna and power amplifier element in accordance with an embodiment.

FIG. 5 is an example of a configuration for transistor devices 500 for an antenna and power amplifier element in accordance with an embodiment. FIG. 6 is an example of a configuration for transistor devices 600 for an antenna and power amplifier element in accordance with another embodiment. The transistor devices 500 or 600 may be used in the antenna and power amplifier elements 102 and 200. Transistor devices, such as device 500 and 600, for high frequency operation must minimize the length of gate fingers 502 and interconnect metal due to phase changes and losses in the narrow fingers 502. Either a single manifold of short fingers 502 as illustrated in FIG. 5, or a conventional T gate configuration 602 as illustrated in FIG. 6 provide for a device that can be scaled in a single dimension without the introduction of additional parasitics. Each of the transistors 500 and 600 may be field effect transistors (FET) or similar type gate transistors. The transistors 500 may include routing 504 or electrical connection to the gate fingers 502 and routing 506 to the source terminals 508 and drain terminals 510. Similarly, the transistors 600 may include routing 604 or electrical connection to the gates 602 and routing 606 to the source terminals 608 and drain terminals 610.

Figure 7:
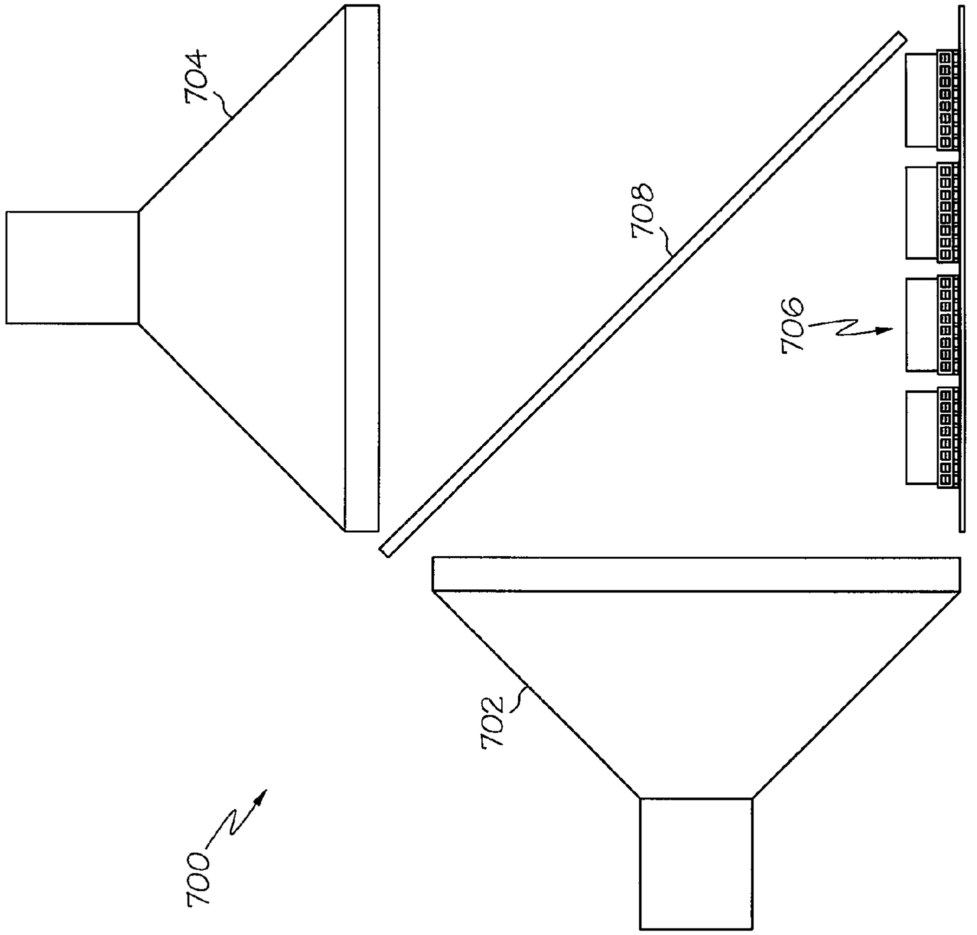
FIG. 7 is an example of a configuration using input and output horn antennas for use with an antenna and power amplifier array in accordance with an embodiment.

FIG. 7 is an example of a RF system 700 using input and output horn antennas 702 and 704 for use with an antenna and power amplifier array 706 in accordance with an embodiment. The antenna and power amplifier array 706 may be the same as the antenna and power amplifier array 100 in FIG. 1. The input to the antenna and amplifier array 706 may be applied from the input or receive horn antenna 702. The output at a different polarization may be extracted from the output or transmit horn antenna 704 with a wire grid or screen polarizer 708 to separate the signals. The wire grid or screen polarizer 708 may be substantially rectangular in shape extending over the antenna and power amplifier array 706 substantially the entire length and width of the array 706. The wire grid or screen polarizer may also extend at an angle relative to an opening of each of the receive and transmit horn antennas 702 and 704. The output may also be radiated directly as the array of elements will have a radiation pattern with useful directivity. The radiation pattern will change somewhat through the amplitude states and this will affect the coupling efficiency to the output or transmit horn 704 or the directivity of the pattern in the case of direct radiation. This variation may be calibrated out. It may be used to create additional amplitude states because an identical number of amplifiers at the same power condition but a different physical location within the array would have a different effective power transfer.

Figure 8:
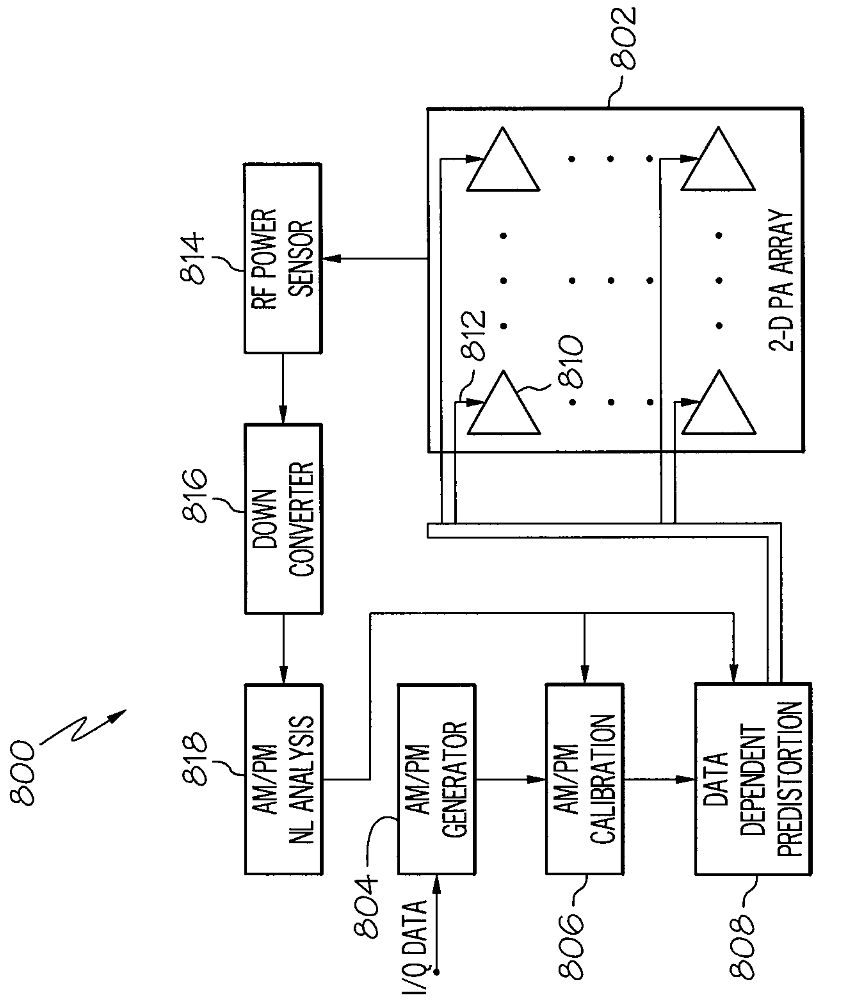
FIG. 8 is a block schematic diagram of an example of a RF system using an antenna and power amplifier array in accordance with an embodiment.

FIG. 8 is a block schematic diagram of an example of a RF system 800 using an antenna and power amplifier array 802 in accordance with an embodiment. The antenna and power amplifier array 802 may be similar to the array and elements described with reference to FIGS. 1 and 2. The RF system 800 may include an amplitude modulation and phase modulation (AM/PM) generator 804 to receive data, for example I/Q data. An AM/PM calibration unit 806 may receive output signals from the AM/PM generator 804. A data dependent pre-distortion unit 808 may receive output signals from the AM/PM calibration unit. A two-dimensional antenna and power amplifier array 802 may transmit data from the data dependent pre-distortion unit 808. The two-dimensional antenna and power amplifier array 802 may include a plurality of antenna and quasi-optical power amplifier element assemblies 810. The RF system may also include circuitry 812, as described in more detail with reference to FIG. 9, to selectively operate each of the plurality of antenna and quasi-optical power amplifier element assemblies 810 at a predetermined digital modulation scheme.

The RF system 800 may also include a RF power sensor 814 for sensing a power of electromagnetic energy emitted by the antenna and power amplifier array 802. A down converter 816 may convert an output signal from the RF power sensor 816 to a form or level for use by an AM/PM non-linear (NL) analysis unit 818 which receives the output from the down converter 816. The AM/PM NL analysis unit 818 may provide an input to the AM/PM calibration unit 806 and the data dependent pre-distortion unit 808 for proper and efficient operation of the RF system 100 and antenna and power amplifier array 802.

Figure 9:
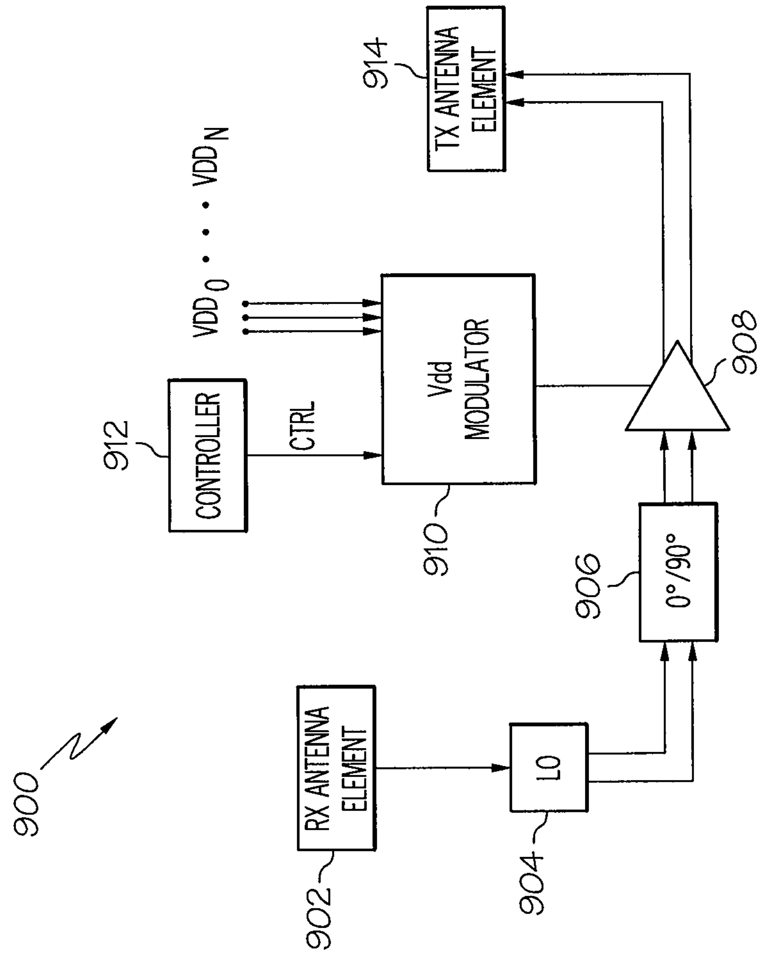
FIG. 9 is a detailed block schematic diagram of an example of an antenna and power amplifier element in accordance with an embodiment.

FIG. 9 is a detailed block schematic diagram of an example of an antenna and power amplifier element 900 in accordance with an embodiment. The antenna and power amplifier element 900 may be used for the antenna and power amplifier element 810 and control circuitry 812 in the array 802 in FIG. 8. Signals from a receive antenna element 902 may be processed by a local oscillator (LO) 904. The output from the LO 904 then may be processed by a phase shift unit 906 before being passed to a power amplifier 908. The power amplifier may be a quasi-optic power amplifier similar to that previously described. A voltage (Vdd) modulator 910 may be coupled to the power amplifier. Different modulation voltages ($VDD_0$-$VDD_N$) may be selectively supplied to the Vdd modulator 910 for selecting or controlling a modulation scheme transmitted by the power amplifier 908. Accordingly the relative amplitude may be controlled with discrete digitally controlled DC voltage levels. A control signal (Ctrl) from a controller 912 may be received by the Vdd modulator 910 to select the desired modulation voltage corresponding to the desired modulation scheme. The output of the power amplifier 908 is coupled to a transmit antenna element 914 for transmitting the data.

The controller 912 or circuitry 812 may permit each of the antenna and power amplifier elements or element assemblies 810, 900 to be selectively turned on and off or to calibrate chosen elements out of the array 802. The controller 912 or circuitry 812 may also vary a phase of each element 810, 900 to allow beam steering and to enhance spatial power combiner efficiencies. Some of the elements 810 of the array 802 may be shutdown dynamically to enhance overall average power amplifier efficiency according to a type of waveform that is being transmitted. Overall average power amplifier efficiency may be defined as the actual radiated power of the array 802 to input power or average of radiated power by each element to input power.

The antenna and power amplifier elements or element assemblies as described herein provide an antenna, transistor gate geometry and harmonic trap system suitable for use in a high efficiency quasi-optical amplifier that has a scalable dimension to increase power per element. As previously described, the elements in the antenna array may be divided between at least two groups with a 90 degree phase difference between them so that the constellation states of a high order digital modulation scheme may be produced directly by varying the relative amplitude between the groups. To support symmetric full four quadrant operation, four groups at 0, 90, 180, and 270 degrees may be used or appropriate switching of delay elements to create these four phase states within two main operational groups could be used. This configuration would allow for ordinary carrier phase recovery circuits or algorithms to be used. In addition, a relative amplitude may be controlled not with an analog modulator but with discrete digitally controlled DC voltage levels as described with reference to FIG. 9. The combination of a large number of elements, all with multiple digitally controlled power levels allows for a sufficiently large number of overall amplitude states to be produced digitally by the array without the difficult to design analog modulator. The resultant amplitude and phase is produced by the vector addition of the two groups with the 90 degree phase difference. Digital control of drain voltage of the power amplifiers can be accomplished faster and with fewer parts than an analog modulator which must itself operate as a switching regulator within an analog feedback loop to achieve the necessary efficiency.

Additionally, the spatial location and power level of amplifiers within a group may be modified to create additional non-redundant amplitude states by deliberately broadening the radiation pattern. In addition, the variations in the radiation pattern due to the changing relative amplitude between the two amplifier groups can be determined and used to calculate pre-distortion coefficients for use at the input to the system. The array approach described herein allows automated rapid open loop or closed loop calibration of power amplifier output power using simplified on chip direct current measurements of power amplifier device performance, that correlate to power amplifier switching performance. The adaptive voltage supply technique and on chip calibration circuitry allows adjustment of power amplifier output power.

Although specific embodiments have been illustrated and described herein, those of ordinary skill in the art appreciate that any arrangement which is calculated to achieve the same purpose may be substituted for the specific embodiments shown and that the embodiments may have other applications in other environments. This application is intended to cover any adaptations or variations of the embodiments. The following claims are in no way intended to limit the scope of the disclosure to the specific embodiments described herein.

What is claimed is:

1. An antenna and power amplifier element assembly, comprising:

an antenna assembly;

a quasi-optic power amplifier including an output transistor coupled to the antenna assembly;

electrical feed circuitry associated with the antenna and power amplifier assembly; and a harmonic trap coupled to the quasi-optic power amplifier, wherein the harmonic trap covers at least a portion of the electrical feed circuitry and traps or mitigates any harmonic signals transmitted from the electrical feed circuitry to the antenna assembly.

2. The antenna and power amplifier element assembly of claim 1, further comprising a single equal phase input and output plane, wherein the antenna assembly, the quasi-optic power amplifier and the harmonic trap are formed with the single equal phase input and output plane, and wherein the antenna assembly, the quasi-optic power amplifier and the harmonic trap are adapted to be scalable to increase an output power of the antenna and power amplifier element assembly with a minimal parasitic effect resulting from the antenna assembly, the quasi-optic power amplifier and the harmonic trap being formed with the single equal phase input and output plane and the plane being extendable in a predetermined dimension.

3. The antenna and power amplifier element assembly of claim 1, wherein the quasi-optic amplifier is adapted for operation as a predetermined class quasi-optical amplifier with a scalable dimension for increasing an operating power of each quasi-optical amplifier in an array.

4. The antenna and power amplifier element assembly of claim 1, wherein the antenna and power amplifier element assembly comprises an architecture to substantially maximize efficiency of direct current (DC) to RF power conversion in the quasi-optical amplifier operating at any frequency and in particular at millimeter wave frequencies between about 40 GHz and about 220 GHz or higher and to support a predetermined digital modulation scheme.

5. The antenna and power amplifier element assembly of claim 1, further comprising:

a substrate, the quasi-optic power amplifier being formed on the substrate; and the antenna assembly comprising:

a receive antenna assembly electrically coupled to the quasi-optic power amplifier and extending from the substrate; and a transmit antenna assembly electrically coupled to the quasi-optical power amplifier, the transmit antenna assembly comprising:

a first transmit antenna element or first array of transmit antenna elements extending from the substrate on one side of the receive antenna assembly and extending from the substrate at a predetermined angle relative to a plane defined by the substrate; and a second transmit antenna element or second array of transmit antenna elements extending from the substrate on an opposite side of the receive antenna assembly and extending from the substrate at the predetermined angle relative to the plane defined by the substrate.

6. The antenna and power amplifier element assembly of claim 5, wherein the harmonic trap comprises:

a first harmonic trap portion formed on a side of the first transmit antenna element or first array of transmit antenna elements opposite to the receive antenna assembly; and a second harmonic trap portion formed on a side of the second transmit antenna element or second array of transmit antenna elements opposite to the receive antenna assembly.

7. An antenna and power amplifier array assembly, comprising:

a plurality of antenna and power amplifier element assemblies formed in a predetermined array configuration on a substrate, each of the plurality of antenna and power amplifier element assemblies comprising:

a power amplifier transistor array;

a receive antenna assembly electrically coupled to the power amplifier transistor array;

a first transmit antenna assembly electrically coupled to the power amplifier transistor array and extending from the substrate on one side of the receive antenna assembly;

a second transmit antenna assembly electrically coupled to the power amplifier transistor array and extending from the substrate on an opposite side of the receive antenna assembly; and a harmonic trap electrically coupled to the power amplifier transistor array.

8. The antenna and power amplifier array assembly of claim 7, wherein the first and second transmit antenna assemblies are co-located with the receive antenna assembly and wherein the receive antenna assembly is operable in one polarization and the first and second transmit antenna assemblies are operable in a different polarization to prevent coupling between the receive antennas and the transmit antennas.

9. The antenna and power amplifier array assembly of claim 7, wherein the harmonic trap comprises:

a first harmonic trap portion formed on a side of the first transmit antenna assembly opposite to the receive antenna assembly; and a second harmonic trap portion formed on a side of the second transmit antenna assembly opposite to the receive antenna assembly, wherein each of the harmonic trap portions comprise parallel plate transmission lines adapted to be extendable on an equal phase plane.

10. The antenna and power amplifier array assembly of claim 9, wherein the first and second harmonic trap portions are adapted to provide an open circuit for all harmonic frequencies for class E operation of the antenna and power amplifier assembly, and wherein the first and second harmonic trap portions are adapted to provide an open circuit for odd harmonics and a short circuit for even harmonics for class F operation of the antenna and power amplifier assembly.

11. The antenna and power amplifier array assembly of claim 7, wherein each of the first transmit antenna assembly and the second transmit antenna assembly comprise a broad face to act as a corner reflector to concentrate power on the receive antenna assembly.

12. The antenna and power amplifier array assembly of claim 7, wherein each of the first and second transmit antenna assemblies comprise a plurality of dipole antennas connected together, formed in a row and bent at a predetermined angle to provide a selected radiation pattern.

13. The antenna and power amplifier array assembly of claim 7, wherein each antenna and power amplifier element assembly comprises a quasi-optical amplifier element adapted to be scalable in a predetermined dimension to increase an operating power of each antenna and power amplifier element assembly.

14. The antenna and power amplifier array assembly of claim 13, wherein the antenna and power amplifier element assemblies are divided into at least two groups, each group being operable at a 90 degree phase difference from the other groups and the antenna and power amplifier element assemblies of each group being formed in an alternating arrangement on the substrate with adjacent antenna and power amplifier element assemblies having 90 degree phase differences.

15. The antenna and power amplifier array assembly of claim 13, wherein the antenna and power amplifier element assemblies are configured to support symmetric full four quadrant operation.

16. The antenna and power amplifier array assembly of claim 13, wherein each of the two groups of antenna and power amplifier element assemblies are operable at variable power settings to result in a vector summation capable of creating different amplitude and phase states corresponding to different digital modulation schemes.

17. The antenna and power amplifier array assembly of claim 16, wherein the variable power setting for each antenna and power amplifier element assembly is controlled by a discrete digitally controlled voltage level.

18. The antenna and power amplifier array assembly of claim 16, wherein the different digital modulation schemes comprise a 64 state quadrature amplitude modulation (64QAM) and an orthogonal frequency division multiple access (OFDM) mode.

19. The antenna and power amplifier array assembly of claim 7, further comprising circuitry for varying a phase of each antenna and power amplifier element assembly to allow beam steering and to enhance spatial power combiner efficiencies.

20. The antenna and power amplifier assembly of claim 7, further comprising a controller to selectively turn on or off each of the plurality of antenna and power amplifier element assemblies or to calibrate chosen antenna and power amplifier element assemblies out of the antenna and power amplifier array assembly.

21. The RF system of claim 19, further comprising:

a radio frequency (RF) power sensor for sensing a power of electromagnetic energy emitted by the antenna and power amplifier array;

a down converter to convert an output signal from the RF power sensor; and an AM/PM NL analysis unit to receive an output from the down converter, wherein the AM/PM NL analysis provides an input to the AM/PM calibration unit and the data dependent pre-distortion unit.

* * * * *